Oct. 11, 1955   L. BRÜCK ET AL   2,720,609
PROGRESSIVE WAVE TUBES
Filed Feb. 3, 1949

INVENTORS
LOTHAR BRUCK
HARRY HUBER
by Haseltine Lake + Co.
AGENTS.

2,720,609

PROGRESSIVE WAVE TUBES

Lothar Brück and Harry Huber, Paris, France, assignors to Compagnie Generale de Telegraphie Sans Fil, a corporation of France Application February 3, 1949, Serial No. 74,328

Claims priority, application France February 10, 1948

5 Claims. (Cl. 315—3.5)

The maximum amplification that can be obtained with a progressive wave tube depends, for a given current, on the attenuation produced by the helix. The stronger the current in the tube, the greater is the amplification. But in order to prevent self-excitation of the tube, it is also necessary for the attenuation to be sufficient. However, it is not necessary that such attenuation be distributed uniformly along the helix, as would occur for example in the case in which the helix was made of a material characterised by high properties of attenuation, such as iron. The attenuating action of the helix may be concentrated in a small portion thereof, towards its middle, while its input and output ends have almost no attenuating action. Such a locally increased attenuation can be obtained for example by coating the quartz rods that act as supports for the helix with a thin layer of colloidal graphite.

However, a highly localised attenuation of this kind must not produce reflections at the input of the helix, such reflections being liable to set up standing waves and so produce self-excitation of the tube. It is therefore necessary for the attenuation to be applied in such a manner that the energy reflections which it produces are prevented or are practically negligible.

It has been found, on the one hand, that coating the supporting rods with layers of graphite as hereinbefore mentioned, has numerous drawbacks, since for satisfactory operation there must be a good contact between the layer of graphite and the convolutions of the wire of the helix; if the wire only bears lightly against the layer of graphite, the contact is indefinite and the attenuation is not stable. On the other hand, the layer of graphite must be very thin, because, over a length of the order of a millimetre, its resistance has to be greater than 500 Ω in order to prevent the objectionable reflections; it is therefore liable to be damaged easily when the tube is being assembled. Even by lightly touching the wires of the helix, the contacts between the wire and the layer of graphite may be broken. Furthermore, it is not an easy matter to prepare a layer of graphite of the requisite strength.

In order to obviate these various drawbacks and furthermore produce electric conditions which are favorable for the satisfactory operation of the tube, the present invention proposes to obtain the localised attenuation of the helix by means of a dielectric material which is characterized by a large loss angle.

The invention will be better understood from the following detailed description of several embodiments thereof when read in connection with the accompanying drawings in which.

Figure 1:
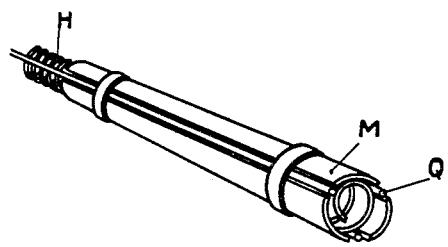
Fig. 1 is a perspective view of a helical delay line showing one form of the attenuation-producing means.

Referring to Fig. 1, the dielectric material M is fixed to the helix H outside the wire coils thereof and between the quartz supporting rods Q. The material M, which is arranged in a plurality of cylindrical sectors coaxial with the helix H, surrounds the exterior surface of the helix over a part of its length. Since the current does not flow through the material M, it does not matter if the helix is in contact with said dielectric material or not. Said material may in particular be slate or a material mainly comprising ceramic substances having a great angle of losses.

Figure 2:
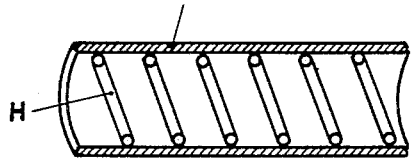
Fig. 2 is a view partly in section taken longitudinally of the coil wherein the dielectric is in the form of a surrounding tube.

The insulating material may also be of the shape of a continuous tube that completely surrounds the helix over the entire length thereof, as shown in Fig. 2 wherein the helix H is inserted in a glass or ceramic tube C and touches the inner surface thereof.

Figure 3:
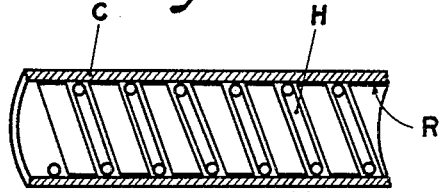
Fig. 3 is a view similar to Fig. 2 showing additionally a resistance layer on the inner surface of the tube.

The advantage of avoiding bad contacts, which is provided by the damping by means of dielectric losses, can be combined with the advantage of being able to obtain any degree of attenuation, which is provided by a resistance layer, by coating the inner surface of the insulating tube with a resistance layer which is so arranged as not to touch the wire of the helix, as shown in Fig. 3.

In this figure, the inner surface of the tube C is furthermore provided with a resistance layer R, for example of graphite, or with a layer that forms a thin metallic film of helical shape of the same pitch as the wave-propagating helix H. Said helix H is inserted in the tube in such a manner that it only touches the walls in the bare regions, i. e. in the spaces between the convolutions of the resistance layer. It is therefore not in contact with the layer, the lines of the electric field which pass outside the helix from one convolution to the other passing across a small gap of free space or of the dielectric material before penetrating into the resistance layer. The whole arrangement behaves like a resistance with two capacities in series.

By way of example of a method for obtaining the resistance layer, more particularly when it is metallic, mention may be made of the method that comprises stretching a wire in the axis of the glass or ceramic tube in which the wave-propagating metal helix has previously been inserted, and evaporating said wire by any method. The metal of the wire is deposited on the one hand on the inner surface of the helix where this addition does not matter, and on the other hand on the inner surface of the insulating tube, in the form of a very thin film, with the exception of the portions which are screened by the shadow of the wire of the helix. If the ends of the tube are provided with electrodes, the resistance of the layer deposited by evaporation can be measured and its thickness thus readily calibrated.

Figure 4:
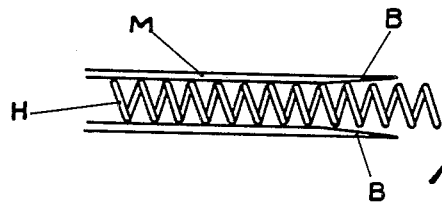
Figs. 4 and 5 are variant modifications shown diagrammatically in perspective for effecting gradual change in the characteristic impedance.

In order to prevent, at the input end of the attenuating portion, wave reflections due to the variation of the characteristic impedance produced by the presence of the attenuating material, provision is made for a gradual passage over the attenuating layer. Such a transition can be obtained by various means. In particular, it can be obtained, for example, merely by bending away from the helix, as shown in Fig. 4, the ends B of the members of which the assembly forms the dielectric M, so that said dielectric penetrates gradually and slowly into the electric field of the helix H. In this manner, the characteristic impedance in turn only varies slowly as the wave passes.

Figure 5:
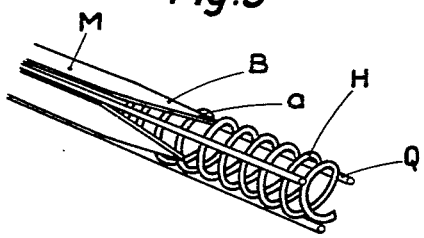

Fig. 5 also shows, by way of example, another manner of obtaining said transition. In this embodiment, the ends B of the material M are tapered or flag-shaped, but the cylindrical segments of dielectric are not bent away from the helix. It is obvious that in this case a jump occurs in the value of the characteristic impedance at the level of the tips $a$. But so long as the space between two disturbance levels of this kind is not large relatively to the wavelength, a line section comprising several regions of this kind may be considered as being a line with a uniform distribution of the dielectric, the constant $\epsilon'$ of which is smaller than the constant $\epsilon$ of the material actually used.

Moreover, the constant $\epsilon'$ depends, in this case, on the density of the distribution of the dielectric along the line, and it will be understood that this new embodiment enables a similar effect to that produced by the embodiment of Fig. 4 to be obtained more readily. Furthermore, it is naturally possible to use a combination of the two arrangements mentioned, or other embodiments that can easily be devised, without exceeding the scope of the present invention.

The use of dielectric materials as attenuators has the advantage of enabling any desired degree of attenuation to be obtained easily. If it is desired to vary the attenuation, it is only necessary to cover the helix, at suitable places thereon, with sectors of dielectric material of suitably chosen lengths. Furthermore, by using such materials in the manufacture of the tubes, a scale of values for the attenuation is obtained which is substantially more extensive than with the use of attenuating layers of graphite.

Figure 6:
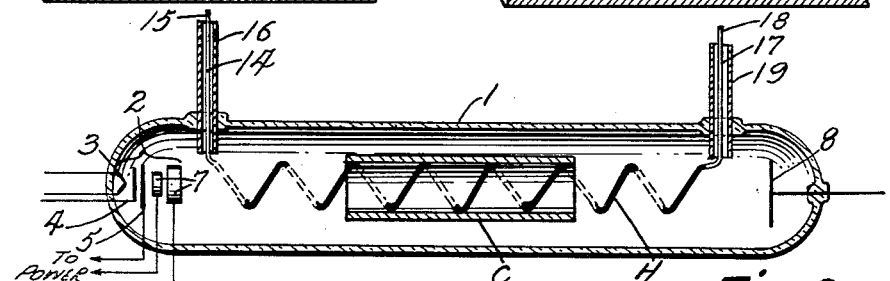
Fig. 6 is an axial view in section of a traveling wave tube embodying a delay line in accordance with the present invention.

The travelling wave tube of Figure 6 comprises an elongated glass envelope 1, inside of which is positioned an electron gun 2 of conventional construction as used in cathode ray tubes and including a heater 3, a cathode 4, a control grid 5, and accelerating electrodes 6 and 7. When the electrodes of the gun 2 are energized by a suitable power source not shown, an axial beam of electrons is generated in a direction toward a disc-shaped collector electrode 8 arranged at the opposite end of the envelope 1.

Between the gun 2 and the electrode 8 is positioned a helix H coaxial with the electron beam generated by the gun 2. Over a part of its length, the helix is surrounded by a dielectric cylinder C in accordance with the present invention.

A coaxial input line 14 including an inner conductor 15 and an outer conductor 16 extends into the envelope 1 at a point adjacent the electron gun 2. The inner conductor 15 is electrically connected to the adjacent end of the helix H. A similar coaxial output line 17 including an inner conductor 18 and an outer conductor 19 extends through the envelope 1 at the other end of the helix H, the inner conductor 19 being electrically connected to the helix.

What we claim is:

1. In a traveling wave tube, a vacuum-tight envelope, means at one end of said envelope comprising an electron gun for emitting an electron beam traveling at a predetermined velocity, a collector electrode at the other end of said envelope positioned to receive said beam, a delay line of helical shape extending coaxially with said beam between said gun and said collector electrode, means supporting said delay line in said envelope, and attenuating means for said delay line, distinct from said envelope and supporting means, and comprising a plurality of cylindrical sectors of dielectric material coaxial with said delay line and surrounding substantially the exterior surface thereof over at least a part of its axial length to be attenuated.

2. In a travelling wave tube as in claim 1, said cylindrical sectors having tapered ends.

3. In a travelling wave tube as in claim 1, said cylindrical sectors being tapered away from each other at their ends.

4. In a travelling wave tube as in claim 1, said cylindrical sectors having ends spaced gradually away from the surface of said delay line.

5. In a travelling wave tube as in claim 1, said cylindrical sectors being tapered away from each other and spaced gradually away from the surface of said delay line.

References Cited in the file of this patent

UNITED STATES PATENTS

| Number | Name | Date |
|---|---|---|
| 2,064,469 | Haeff | Dec. 15, 1936 |
| 2,122,538 | Potter | July 5, 1938 |
| 2,233,126 | Haeff | Feb. 25, 1941 |
| 2,300,052 | Lindenblad | Oct. 27, 1942 |
| 2,413,608 | Di Toro | Dec. 31, 1946 |
| 2,541,843 | Tiley | Feb. 13, 1951 |
| 2,575,383 | Field | Nov. 20, 1951 |
| 2,611,101 | Wallauschek | Sept. 16, 1952 |
| 2,636,948 | Pierce | Apr. 28, 1953 |
| 2,679,019 | Lindenblad | May 18, 1954 |